United States Patent [19]

Bourque

[11] Patent Number: 4,696,781
[45] Date of Patent: Sep. 29, 1987

[54] COMPOSITE FIRST WALL FOR FUSION DEVICE

[75] Inventor: Robert F. Bourque, San Diego, Calif.

[73] Assignee: GA Technologies Inc., San Diego, Calif.

[21] Appl. No.: 664,162

[22] Filed: Oct. 24, 1984

[51] Int. Cl.[4] .............................................. G21B 1/00
[52] U.S. Cl. .................................... 376/136; 376/150
[58] Field of Search ..................... 376/136, 146, 150; 292/17, 256.6

[56] References Cited

U.S. PATENT DOCUMENTS

| | | | |
|---|---|---|---|
| 3,322,141 | 5/1967 | Gans, Jr. et al. | 137/312 |
| 3,650,182 | 3/1972 | Phillips | 92/128 |
| 3,924,767 | 12/1975 | Arrandale et al. | 215/12 R |
| 3,980,916 | 9/1976 | Kammsky | 313/231.3 |
| 4,072,243 | 2/1978 | Conant et al. | 215/12 R |
| 4,532,101 | 7/1985 | Doll | 376/136 |
| 4,619,807 | 10/1986 | Kotzlowski | 376/136 |

FOREIGN PATENT DOCUMENTS

| | | |
|---|---|---|
| 52-17198 | 2/1977 | Japan . |
| 54-125347 | 9/1979 | Japan . |
| 931912 | 7/1963 | United Kingdom . |

OTHER PUBLICATIONS

Cohen et al, "Nuclear Fusion", vol. 21, No. 2, 1981, pp. 233-249.
Winkler et al, "9th Symposium on Engineering Problems of Fusion Research, Oct. 1981, pp. 1383-1389.
Kugel et al, "Nuclear Technology/Fusion", vol. 2, Oct. 1982, pp. 712-722.
Abdou, "INTOR Impurity Control and First Wall System", Apr. 1983.
Jack Hovingh, Heat Transfer in Inertial Confinement Fusion Reactor Systems, May 14, 1979, p. 6.
Dr. J. A. Fillo, First-Wall Fusion-Blanket Heat Transfer, May 18, 1982, pp. 5 and 6.
M. Kaminsky, Coatings and Claddings for the Reduction of Plasma Contamination and Surface Erosion in Fusion Reactors, Aug. 23-26, 1980, p. 11.

Primary Examiner—John F. Terapane
Assistant Examiner—Eric Jorgensen
Attorney, Agent, or Firm—Fitch, Even, Tabin & Flannery

[57] ABSTRACT

A first wall structure for use in a fusion device surrounds the plasma region and includes a base wall which is substantially continuous. The base wall has an inner surface which faces the plasma region and an outer surface which faces the first wall coolant. The inner surface has a plurality of recesses. The wall structure also includes a number of inserts corresponding in number to the recesses with each insert being received in a respective recess and extending inwardly beyond the inner base wall surface. The inserts are made of material having a substantially greater heat flux capability than the material from which the base wall is formed. A method of forming a composite first wall structure for use in a fusion device, is also disclosed.

12 Claims, 11 Drawing Figures

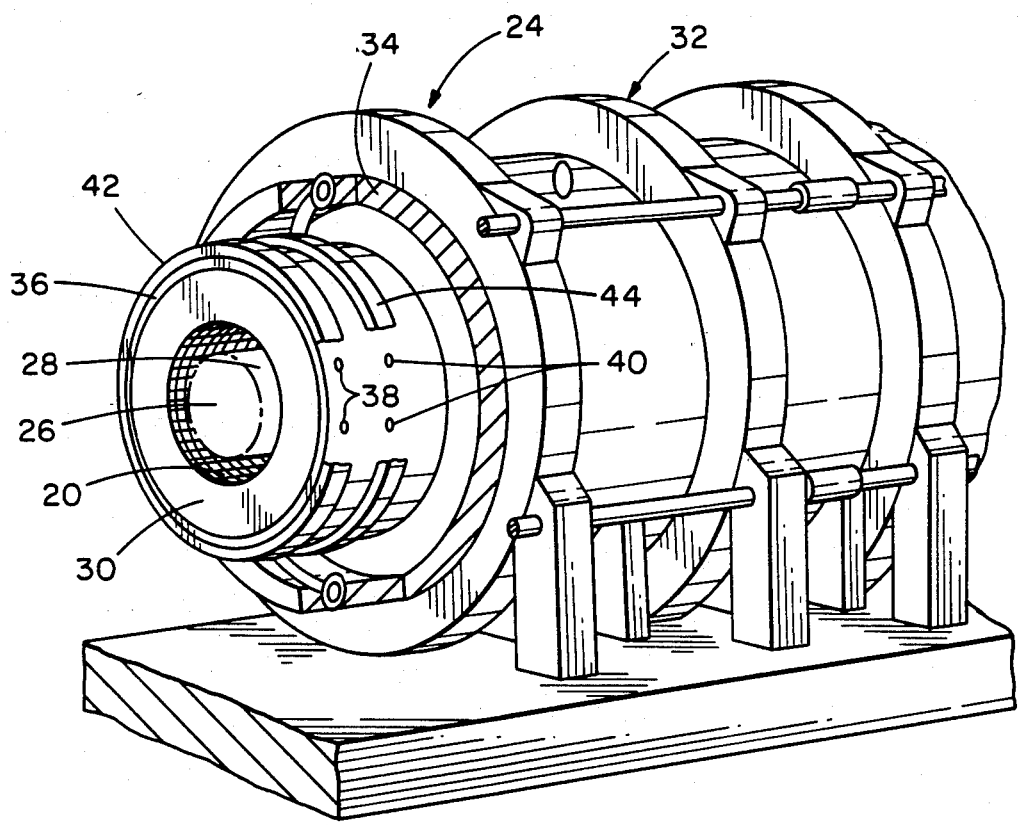
FIG.1
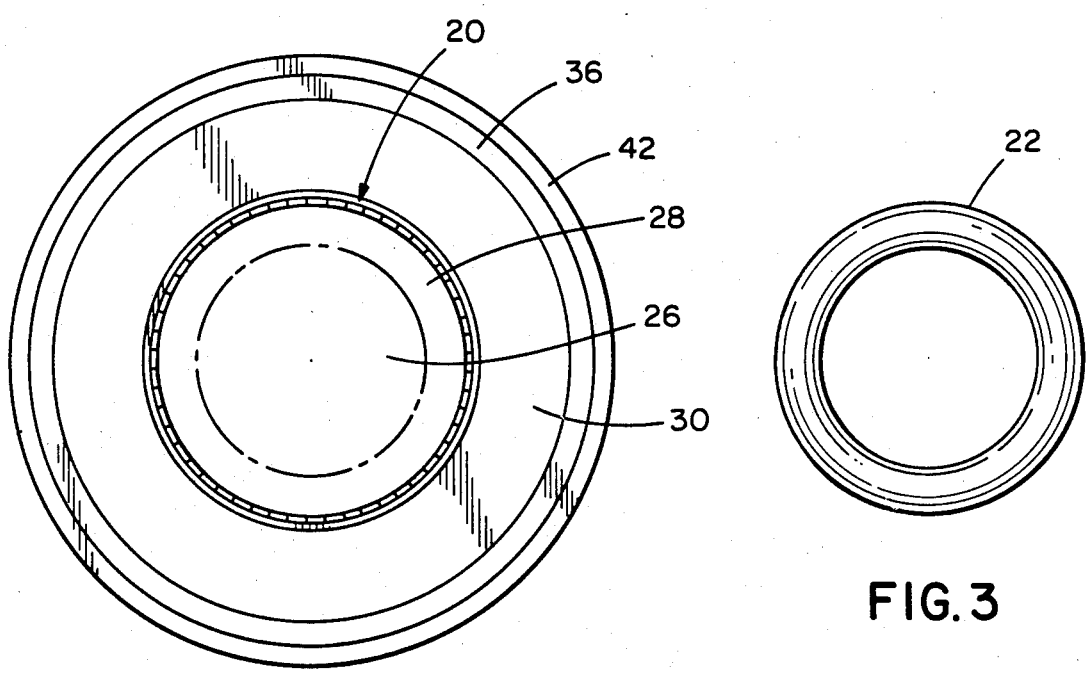
FIG.2
FIG.3

COMPOSITE FIRST WALL FOR FUSION DEVICE

BACKGROUND OF THE INVENTION

The subject invention relates to fusion devices and, more particularly, to a novel first wall for such devices with high power density.

Fusion devices may be based upon the reaction of deuterium and tritium. Nuclei of deuterium and tritium, when brought together with sufficient energy, fuse to form a helium nucleus (an alpha particle), a neutron and 17.6 MeV of kinetic energy. In the conservation of energy, 14.1 MeV goes with the neutron (which has no charge), while the alpha particle (which has positive charge) carries 3.5 MeV.

Taken in transverse section, a central cell of a proposed fusion device includes a central plasma region in which fusion occurs, and a vacuum region encompassing the plasma region. Disposed next outwardly from the center of the cell is a first wall, and then a relatively thick blanket which might contain moderator material and tritium breeding material (lithium). A coolant such as helium, pressurized water or liquid metal is circulated through the blanket and first wall to maintain both at desired temperatures and to transport thermal energy from the device. Surrounding the blanket are magnetic coils which could be constituted by a toroidal, poloidal, helical and other coils or windings which may be either of superconductive or resistive material. The purposes of the magnetic fields are to produce and confine the plasma in the plasma region and away from the first wall. Examples of such fusion devices are disclosed in "WITAMIR-I, A University of Wisconsin Tandem Mirror Reactor Design", by Badger et al., UWFDM-400, University of Wisconsin, 1980; and in U.S. Pat. No. 4,302,284.

Because they have no charge, the high energy neutrons resulting from fusion within the plasma pass through the first wall with little loss of energy. They are slowed by multiple collisions with material in the blanket resulting in volumetric heating of the blanket. This heat can be relatively easily removed by the cooling system of the fusion device circulating coolant through the blanket.

On the other hand, the charged alpha particles drift across the plasma and are stopped by the first surface they hit. In the case of a typical fusion device this is the surface of the first wall facing the plasma. While the alpha particles carry only 20% of the total energy resulting from fusion, their stoppage results in surface heating, not volumetric heating. This heat must be transferred through the first wall structure from the plasma side to the coolant side, a task not easily accomplished when heat fluxes are high because of the high temperature gradients, and thermal stresses induced in the first wall structure by this heat flux.

Putting aside heat transfer considerations for a moment, the first wall of a fusion device has several requirements. It must be vacuum tight. It usually should have relatively high electrical resistance in the direction of the plasma path the first wall defines (toroidal in the case of the fusion device shown in U.S. Pat. No. 4,302,284). If the first wall has relatively low resistance, the magnetic field swing provided by one of the magnets would cause too large a current to flow in the plasma containment vessel defined by the first wall, thus unacceptably reducing the flow of current in the plasma. The first wall also must have erosion resistance because plasma particles strike and displace atoms on the first wall. Thus, a first wall is subject to somewhat conflicting requirements: high heat flux capability, relatively high electrical resistance and the always desirable low weight consideration all suggest a thin first wall structure; while erosion resistance and structural integrity suggest a thick structure, and the vacuum integrity requirement dictates a continuous structure.

It has been suggested that clad materials should be developed for the protection of a first wall. They could be armor plates in the form of tiles mounted on backing plates. These are generally intended for fusion reactors having lower heat flux than the present invention. A first wall of niobium, stainless steel, or another metal having a graphite or carbon curtain thereover has also been suggested. For further information regarding the structure and theoretical operation of such fusion device first walls, reference may be made to the following articles: "Coatings And Claddings For The Reduction Of Plasma Contamination And Surface Erosion In Fusion Reactors" by M. Kaminsky, published by Argonne National Laboratory, Argonne, Ill. 1980 (Conference No. 8008108-1) and "Heat Transfer In Inertial Confinement Fusion Reactor Systems" by J. Hovingh, published by Lawrence Livermore Laboratory, 1979 (Conference No. 790802-77). It is also known to provide a toroidal container for electrical discharge apparatus, with the container having staggered apertures for increasing the loop resistance of the liner. For further information regarding the structure and operation of such a liner, reference may be made to British Pat. No. 931,912.

SUMMARY OF THE INVENTION

Among the several aspects of the present invention may be noted the provision of an improved first wall structure for a fusion device. The first wall structure of the present invention offers improved heat transfer characteristics while maintaining high loop electrical resistance of the plasma containment vessel into which the first wall structure is formed. Furthermore, the improved first wall structure has increased resistance to erosion by plasma bombardment. Additionally, the first wall structure provides a continuous vacuum vessel structure, thereby avoiding well-known problems with discrete insulating breaks. Other aspects and features of the present invention will be, in part, apparent and, in part, pointed out specifically in the following specification and in the accompanying claims and drawings.

Briefly, the first wall structure of the present invention is for use in a fusion device having a plasma region, a blanket structure surrounding the plasma region and windings outside the blanket structure for providing magnetic fields. The first wall structure includes a base wall coolant and a base wall which is substantially continuous and which surrounds the plasma region. The base wall has an inner surface facing the plasma region and an outer surface facing a coolant such as pressurized water with the inner surface having a plurality of indentations or recesses. The wall structure also includes a plurality of inserts, corresponding in number to the recesses, with each insert being received in a corresponding recess. The inserts extend beyond the inner base wall surface toward the plasma region and are made of a material having substantially greater heat flux capability than the material from which the base wall is formed. Desired properties of such insert materials are high thermal conductivity, high tensile strength low modulus of elasticity, and low thermal expansivity.

As a method, the present invention includes several steps:

(1) A base wall is provided which is to be formed into an enclosure for the plasma region. The base wall has an inner surface facing the plasma region and an outer surface facing the first wall coolant.

(2) A plurality of spaced recesses are formed in the base wall extending from the inner surface but short of the outer surface a sufficient distance so that the base wall retains structural integrity.

(3) Retained in each recess is the stem portion of an insert having an enlarged head which extends past the inner surface towards the plasma region. The inserts are formed of a material having a greater heat flux capability than the material from which the base walls are formed.

BRIEF DESCRIPTION OF THE DRAWINGS

FIG. 1 is a partly diagrammatic isometric projection of a portion of a central cell of a fusion device incorporating one preferred embodiment of the first wall structure of the present invention;

FIG. 2 is an enlarged transverse cross-sectional view of the cell of FIG. 1, with certain components removed, showing the composite nature of the first wall structure;

FIG. 3 is a plan view of a toroidal plasma containment vessel which could be formed by the first wall structure of the present invention;

Corresponding reference characters indicate corresponding components throughout the several views of the drawings.

DESCRIPTION OF PREFERRED EMBODIMENTS

Figure 4:
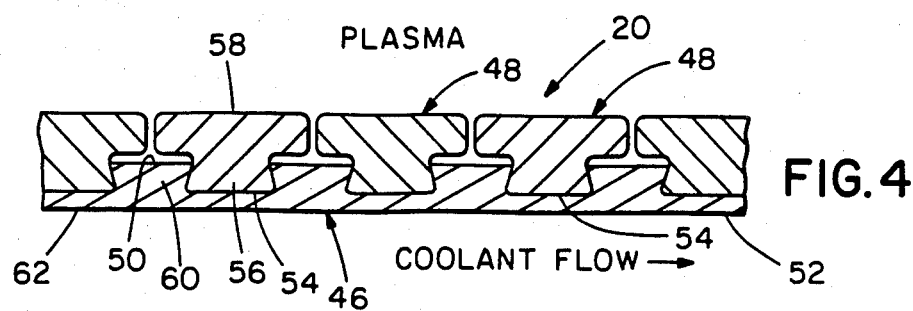
FIG. 4 is a schematic representation of components of one preferred embodiment of a first wall structure of the present invention illustrated in relation to the plasma region and a cooled region of a fusion device.

Referring now to the drawings, a first wall structure of the present invention is indicated generally by reference numeral 20 in FIG. 1. The first wall structure is formed into a closed plasma containment vessel 22, which may be toroidal, as shown, for example, in FIG. 3. While there are various fusion devices having differing closed loop plasma containment vessel shapes, and the first wall structure of the present invention is useful in many of them, for simplicity, the following description will be directed to a containment vessel of toroidal shape. This is the form of the containment vessel in what is known in the fusion community as an OHTE fusion device. The operation and structure of such a fusion device is more fully discussed in commonly-assigned U.S. Pat. No. 4,302,284.

By way of background, a fusion device may be formed of a number of cells 24 placed end to end. As best shown in FIGS. 1 and 2, each of the cells 24 has a central plasma region 26 and a vacuum region 28 surrounding the plasma region. A blanket structure 30 surrounds the vacuum region with the first wall structure 20 disposed on the inside of the blanket structure. The cell 24 also is shown including a magnet system 32 for establishing a magnetic field, and a shield 34 for isolating the magnet system from the blanket structure.

The plasma region, where fusion occurs, is inside the first wall defined by the contiguous interiors of the first wall structures 20 of the various cells 24, which structure 20 makes up the plasma containment vessel 22. The blanket 30 contains moderator materials for slowing the energetic neutrons liberated as a result of the fusion. Heat is transferred outside of the blanket structure by circulating a coolant, for example, helium, pressurized water or liquid metal, through the blanket structure. For this purpose, the blanket structure 30 is surrounded by an outer shell 36 having, for example, coolant inlet and outlet ports 38 and 40, respectively. A coolant inlet manifold 42 and a coolant outlet manifold 44 are connected to the appropriate ports.

When the deutrium-tritium fusion occurs in the plasma region 26, neutrons having 14.1 MeV of kinetic energy and an alpha particles having 3.5 MeV of kinetic energy, are liberated. The neutrons pass through the first wall structure with little loss of energy and heat the material in the blanket structure as a result of multiple collisions with blanket nuclei. In sharp contrast to the action of the energetic neutrons, the alpha particles give up their energy to the first surface they hit. This is the surface of the first wall structure 20 facing the plasma region. Because the first wall must be vacuum tight, assuming no separate vacuum vessel is employed, heat must be transferred from this surface to the coolant by thermal conduction through the first wall structure.

Prior art designs of first wall structures have not been entirely satisfactory because of the many conflicting requirements placed on their structure. One of the prime requirements of the first wall structure is that it exhibit high heat flux capability to carry the heat resulting from alpha particle bombardment away from the struck surface to the blanket structure, to maintain the first wall structure within its design temperature limits. Another major requirement is that the plasma containment vessel formed by the first wall structures have sufficiently high electrical resistance. Otherwise too low a magnetic field component would be available to induce current flow in the plasma. The first wall structure must also have sufficient thickness to withstand erosion due to plasma particles displacing atoms from it. It must also have mechanical strength at its operating temperature (up to 600 degrees C.), and it must be vacuum tight. High heat flux capability and low loop resistance suggest that the first wall structure be thin while structural integrity and erosion resistance dictate that it should be thick.

Figure 5:
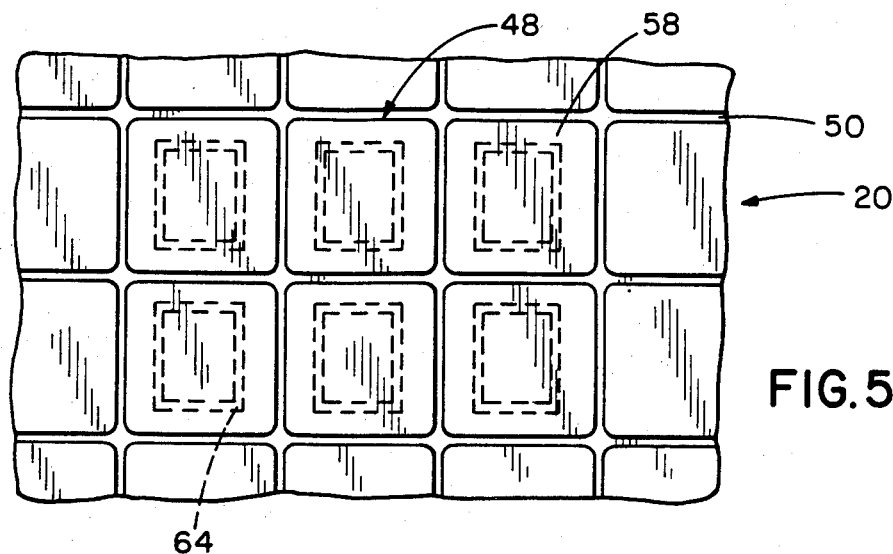
FIG. 5 is a plan view of a section of the first wall structure of the structure shown in FIG. 4 illustrating a base wall and inserts carried by the base wall.

Referring to FIGS. 4 and 5, a first wall structure 20 of one preferred embodiment of the present invention includes a base wall 46 which is substantially continuous and vacuum tight, and which carries a plurality of inserts 48 made of a material having greater heat flux capability than that from which the base wall 46 is formed. It is noted that FIGS. 4 through 11 depict several preferred embodiments of components of the base wall and the inserts in planar form. It will be understood that these components, in use, are arcuate to define a containment vessel. However, the schematic planar form has been chosen for ease of explanation and understanding of the present invention. The base wall 46 has an inner surface 50 facing the plasma region 26 and an outer surface 52 in full surface contact with a coolant. The inner face is provided with a regular array of recesses or indentations 54 for receiving the inserts 48 with the inserts extending from the inner base wall surface 50 toward the plasma region 26.

More specifically, each of the inserts 48 includes a stem 56 disposed in a respective recess 54, and an enlarged head 58 extending from its stem toward the plasma region 26. The recesses 54 are preferably all of substantially the same configuration. As best shown in FIG. 5, the head 58 of each insert is generally square in plan with adjacent sides of adjacent inserts extending in substantial parallelism. The adjacent heads of the inserts are closely spaced but are not contiguous. Accordingly, they present a nearly continuous surface for bombardment by the neutrons and alpha particles from the plasma region. However, the insert heads do not form an electrically continuous path for the flow of electrical current.

Referring to FIG. 4, the base wall 46 can be considered to be made up of thick sections 60, each of which is positioned between a row of insert stems 56, and thin portions 62 underlying the stems, thus forming the recesses 54. The high flux from the inserts can readily pass from the insert to the coolant through the thin portions 60 under the recess. The thicker sections 60 of the base wall 46 provide the required structure. Together they provide the vacuum seal. The material of the inserts 48 has much greater heat flux capability than that of the base wall, and may or may not have negligible electrical resistivity. The first wall structure 20 thus has a composite nature with the series of thick sections disposed between the rows of the stems 56 providing adequate structure and axial electrical resistance to limit the current induced in the plasma containment vessel 22 and with the inserts 48 and their underlying thin sections 62 of the base wall providing the needed thermal conduction of heat from the distal head surfaces struck by the plasma particles to the base wall coolant. Preferred materials for the base wall 46 include stainless steel and a titanium alloy with a nickel-chromium iron alloy being most preferred. Preferred materials for the inserts 48 include aluminum, silicon carbide, and copper with graphite being most preferred.

Figure 6:
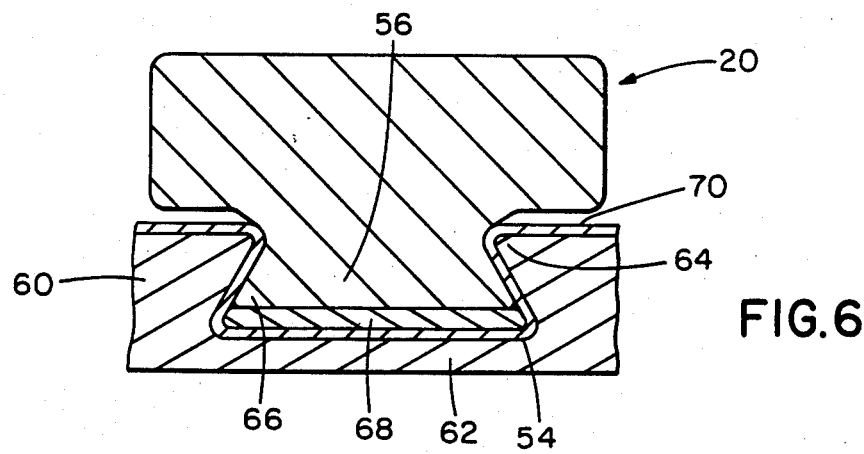
FIG. 6 is a partial longitudinal sectional view of an alternative preferred embodiment of a first wall structure of the present invention wherein the inserts are retained by the base wall in an interference fit.

Referring to FIG. 6, the portion of the base wall 46 defining each indentation has an undercut forming a constricted throat 64 for each indentation. The distal end 66 of each stem 56 is provided with an enlargement so that each insert is retained in its indentation in an interference fit. It is noted that the undercut and enlarged distal end are shown exaggerated, for purposes of explanation. The inserts can be installed by first chilling them to cause them to contract, and moving the distal ends beneath the level of the constricted throats 64. The subsequent expansion of the ends 66 due to their heating to the temperature of the base wall results in their captive retention in the indentations. A soft metal disc or washer 68 can be placed beneath the stem to ensure good heat transfer. Optionally, surfaces of the base wall defining each indentation can be covered with an electrically insulative coating 70, such as of alumina, to further increase the loop resistance of the plasma containment vessel 22.

Figure 7:
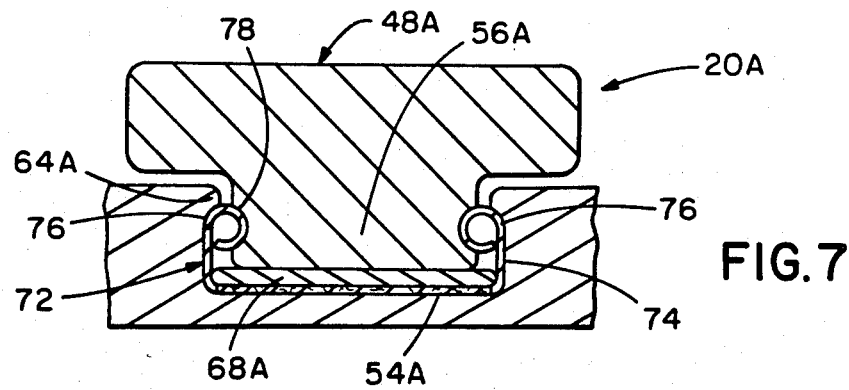
FIGS. 7 and 8, similar to FIG. 6 show other alternative preferred embodiments of the present invention wherein the inserts are retained by means of interference fits.
Figure 8:
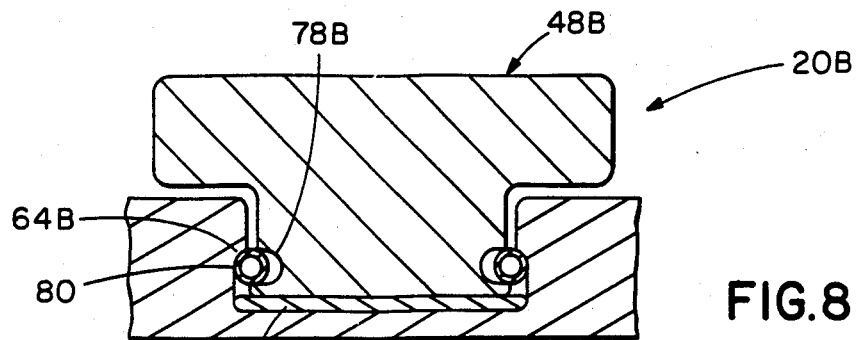

A portion of an alternative preferred embodiment of the first wall structure of the present invention is indicated at reference character 20A in FIG. 7. Components of wall structure 20A corresponding to those of wall structure 20 are designated by the reference numeral assigned to the component of wall structure 20 with the addition of the suffix "A". A holder 72 for encompassing the periphery of the stem 56A is disposed in each indentation 54A. The holder is preferably metallic and formed by side walls 74 having enlarged upper ends 76 formed, for example, by rolling of the sheet material from which the holder is fabricated. Each of the stems 56A has a peripheral groove 78 which receives the enlarged upper ends 76 beneath the level of the indentation throat 64A to retain the inserts 48A. Another alternative embodiment 20B (FIG. 8) of the first wall structure of the present invention is similar to first wall structure 20A in that a holding component is employed. In the case of wall structure 20B, a metallic full or partial ring 80 is used for concurrent reception in the peripheral groove 78B and engagement with the throat 64B.

Figure 9:
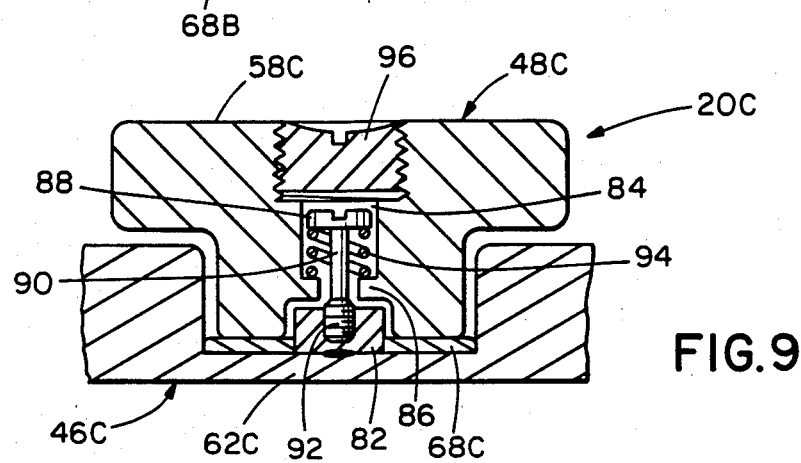
FIGS. 9 and 10, also similar to FIG. 6, depict other alternative preferred embodiments of a first wall structure of the present invention wherein the inserts are retained by the base wall by bolting and brazing, respectively.

Another alternative preferred embodiment of the first wall structure of the present invention is partially shown at reference character 20C in FIG. 9. Each insert 48C is attached to the base wall 46C by bolting. The underlying or thin sections 62C of the base wall are provided with centrally located nuts 82 while each insert 48C has a doubly countersunk axial bore 84 with an internal ledge 86 for accommodating the head 88 of a bolt 90 with a threaded shank 92 for reception by a corresponding nut 82. Each nut 82 is received in the enlarged lower portion of the bore and the head 88 is recessed from the distal end of the enlarged head 58C of the insert. A coiled compression spring 94 is preferably employed beneath the bolt head 88 to bear against the ledge 86 thereby functioning to bias the stem firmly against the underlying thin section 62C of the base wall 46C. A plug 96 fabricated of the same material as the insert may be used to fill the upper portion of the bore above the level of the bolt head 88. As shown, the upper bore portion and the plug have mating threads to hold the plug firmly in place.

Figure 10:
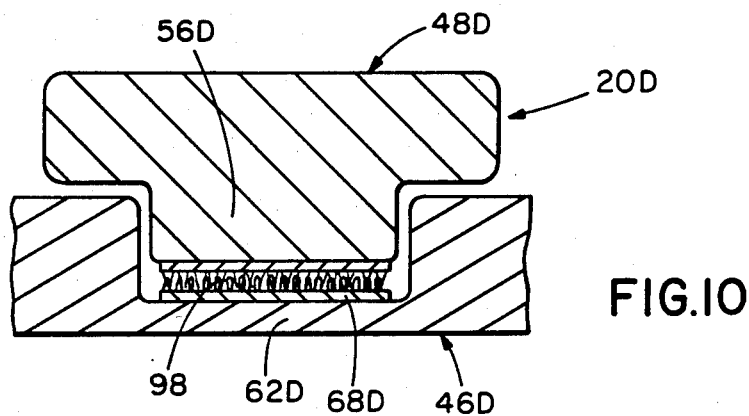

Referring to FIG. 10, another preferred embodiment of the first wall structure of the present invention is partially shown at reference character 20D. As is the first wall structure 20C, the portion of the base wall defining the indentation is not undercut. A pad 98 of woven metallic fiber is positioned beneath the stem 56D of each of the inserts 48D. The pad material has a lower melting temperature than that of either the insert material or the base wall material. The pad 98 is brazed to both the stem 56D and to the underlying thin base wall section 62D to retain the inserts.

Figure 11:
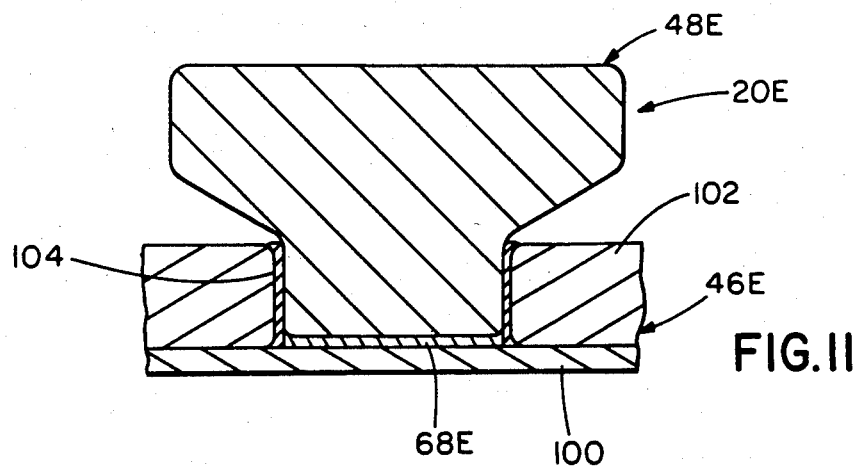
FIG. 11, also similar to FIG. 6, illustrates components of another alternative preferred embodiment of the first wall structure of the present invention wherein the base wall is composite including an outer wall of substantially uniform thickness and an inner wall, positioned against the outer wall and having apertures for receiving the inserts.

Still another alternative preferred embodiment of the first wall structure of the present invention is partially depicted at reference character 20E in FIG. 11. Here the base wall 46E is made up of an outer wall 100 of substantially constant thickness and an inner wall 102, having an array of apertures 104, disposed against the outer wall, thus forming the indentations for receiving the inserts 48E. The inserts 48E may be retained in any of the manners discussed with reference to the previously described preferred embodiments: brazing, bolting, or using an interference fit. Additionally, the insert may be retained by soldering, as shown in FIG. 11.

As a method of forming a composite first wall structure for use in a fusion device, the present invention includes several steps:

(1) A base wall is provided which is to be formed into an enclosure for the plasma region. The base wall has an inner surface facing the plasma region and an outer surface facing the first wall coolant.

(2) A plurality of spaced recesses are formed in the base wall extending from the inner surface but short of the outer surface a sufficient distance so that the base wall retains structural and vacuum integrity.

(3) Inserted and retained in each recess is the stem portion of an insert having an enlarged head which extends past the inner surface toward the plasma region. The inserts are formed of a material having a greater heat flux capability than the material from which the base wall is formed.

Among the ways of accomplishing step (3) are the following:

(A) A metal, having a lower melting point than the materials of the base wall and the insert, is placed beneath the insert item, and brazed to both the item and to the underlying portion of the base wall.

(B) Each insert is bolted to the base wall.

(C) The base wall portion defining each recess is provided with an undercut to equip the recess with a constricted throat. The stem of each insert is formed to have an enlarged distal end having a dimension greater than a corresponding dimension of the constricted throat. Disposition of the distal end of the stem past the constricted throat permits the stem to be held in the recess in an interference fit. Such disposition can be facilitated by chilling the insert to cause its contraction prior to placing it in its recess.

By way of example, assume the base wall 46 is to be formed of a nickel-chromium iron alloy and the inserts are to be formed of graphite. The inside diameter of the first wall 20, see FIG. 2, for an OHTE fusion device may be approximately 2 meters and the first wall, due to alpha particle impingement, might have to be able to conduct a surface heat flux of up to 8 MW/m². The electrical resistance of the toroidal plasma containment vessel 22 formed by the first wall structure is preferably at least twice that of the plasma at the temperature (about 110,000 degrees centigrade) at which plasma has just formed. Under those conditions, the graphite inserts would have a thickness of about 1.3 cm., the base wall thick sections 60 would have a thickness of about 0.3 cm and the base wall thin sections would be required to have a thickness of about 0.04 cm.

In view of the above, it will be seen that the several objects of the invention are achieved and other advantageous results attained.

As various modifications could be made without departing from the scope of the invention, it is intended that all matter contained in the above description shall be interpreted as illustrative and not in a limiting sense.

What is claimed is:

1. A first wall structure for use in a plasma device including a plasma region surrounded by a vacuum region, a blanket structure, and a magnet structure, said first wall structure surrounding said plasma region and said vacuum region inside said blanket structure and said magnet structure and comprising:

a base wall coolant;

a base wall which is substantially continuous and vacuum tight and surrounds said plasma region and said vacuum region and has substantial electrical resistance parallel to the direction of plasma in said plasma region as to permit ready entry into said plasma region of magnetic flux from said magnet structure, said base wall having an inner surface facing said plasma region and an outer surface facing the base wall coolant, said inner surface having a plurality of recesses surrounding said vacuum region and providing respective thin sections of said base wall, a plurality of discrete inserts corresponding in number to said recesses, each insert being secured in a respective recess, said inserts extending inwardly into said vacuum region beyond said inner base wall surface and being made of a material having a greater capability of transmitting heat flux through substantial thickness while withstanding thermal stresses than the material from which said base wall is formed, said thin sections transmitting to said base wall coolant heat flux transmitted by said inserts, each of said inserts comprising a stem portion disposed in a respective recess, and an enlarged head extending from said stem toward said plasma region, the portion of said base wall defining each recess having an undercut so that each recess has a constricted throat, and a holder disposed in each recess below the level of said throat, said holder having side walls with enlargements, said stem having groove means with said enlargements concurrently being received by said groove means and engaging said throat to retain said inserts in their corresponding recesses.

2. A first wall structure as set forth in claim 1 wherein said recesses are all of substantially the same configuration and are disposed in a regular array with adjacent recesses equally spaced.

3. A first wall structure as set forth in claim 1 wherein the head of each insert is generally rectangular in plan and wherein adjacent sides of heads of adjacent inserts extend in substantial parallelism.

4. A first wall structure as set forth in claim 1 wherein heads of adjacent inserts are closely adjacent but are not contiguous.

5. A first wall structure as set forth in claim 1 wherein the material of said base wall is selected from a group consisting of stainless steel, nickel-chromium iron alloy, and a titanium alloy.

6. A first wall structure as set forth in claim 1 wherein the material of said insert material is selected from a group consisting of aluminum, graphite, silicon carbide and copper.

7. A first wall structure for use in a plasma device including a plasma region surrounded by a vacuum region, a blanket structure, and a magnet structure, said first wall structure surrounding said plasma region and said vacuum region inside said blanket structure and said magnet structure and comprising:

a base wall coolant;

a base wall which is substantially continuous and vacuum tight and surrounds said plasma region and said vacuum region and has substantial electrical resistance parallel to the direction of plasma in said plasma region as to permit ready entry into said plasma region of magnetic flux from said magnet stucture, said base wall having an inner surface facing said plasma region and an outer surface facing the base wall coolant, said inner surface having a plurality of recesses surrounding said vacuum region and providing respective thin sections of said base wall, a plurality of discrete inserts corresponding in number to said recesses, each insert being secured in a respective recess, said inserts extending inwardly into said vacuum region beyond said inner base wall surface and being made of a material having a greater capability of transmitting heat flux through substantial thickness while withstanding thermal stresses than the material from which said base wall is formed, said thin sections transmitting to said base wall coolant heat flux transmitted by said inserts, each of said inserts comprising a stem portion disposed in a respective recess, and an enlarged head extending from said stem toward said plasma region, the portion of said base wall defining each recess having an undercut so that each recess has a constricted throat, and ring means disposed about each of said stems and simultaneously engaging the stem and the throat of its corresponding recess to retain its insert.

8. A first wall structure as set forth in claim 7 wherein said recesses are all of substantially the same configuration and are disposed in a regular array with adjacent recesses equally spaced.

9. A first wall structure as set forth in claim 7 wherein the head of each insert is generally rectangular in plan and wherein adjacent sides of heads of adjacent inserts extend in substantial parallelism.

10. A first wall structure as set forth in claim 7 wherein heads of adjacent inserts are closely adjacent but are not contiguous.

11. A first wall structure as set forth in claim 7 wherein the material of said base wall is selected from a group consisting of stainless steel, nickel-chromium iron alloy, and a titanium alloy.

12. A first wall structure as set forth in claim 7 wherein the material of said insert material is selected from a group consisting of aluminum, graphite, silicon carbide and copper.

* * * * *